Figure 1:
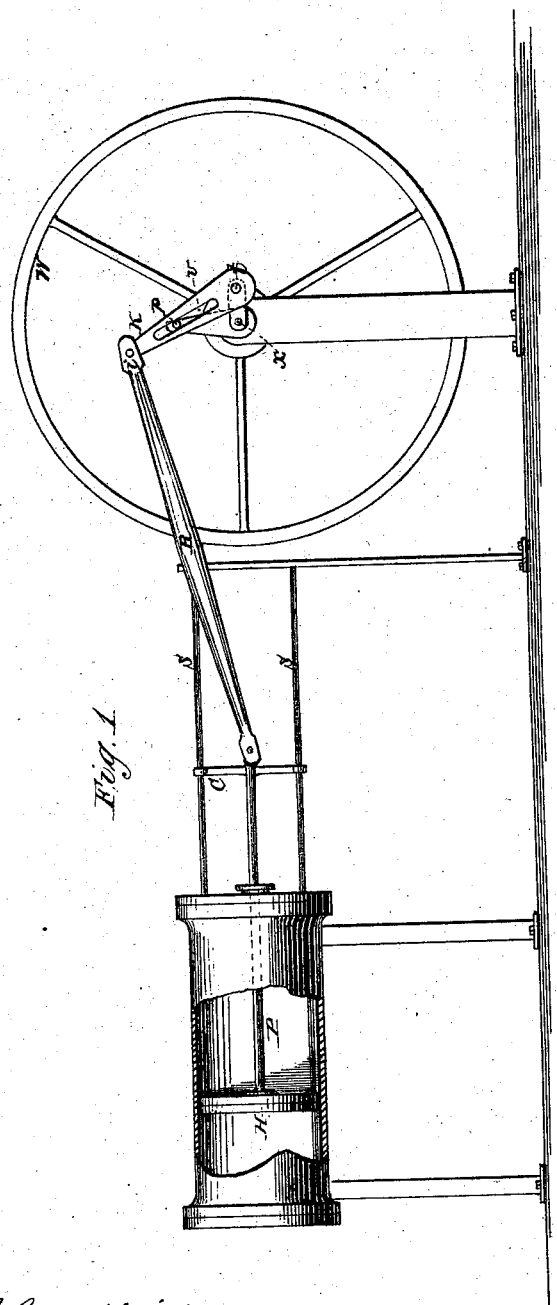

2 Sheets--Sheet 1.

A. R. CRIHFIELD,
Crank and Lever.

No. 163,001. Patented May 11, 1875.

Witnesses:
Cass. F. Blackledge
C. W. Knapp

Inventor:
Aylett R. Crihfield

2 Sheets--Sheet 2.
A. R. CRIHFIELD,
Crank and Lever.
No. 163,001. Patented May 11, 1875.
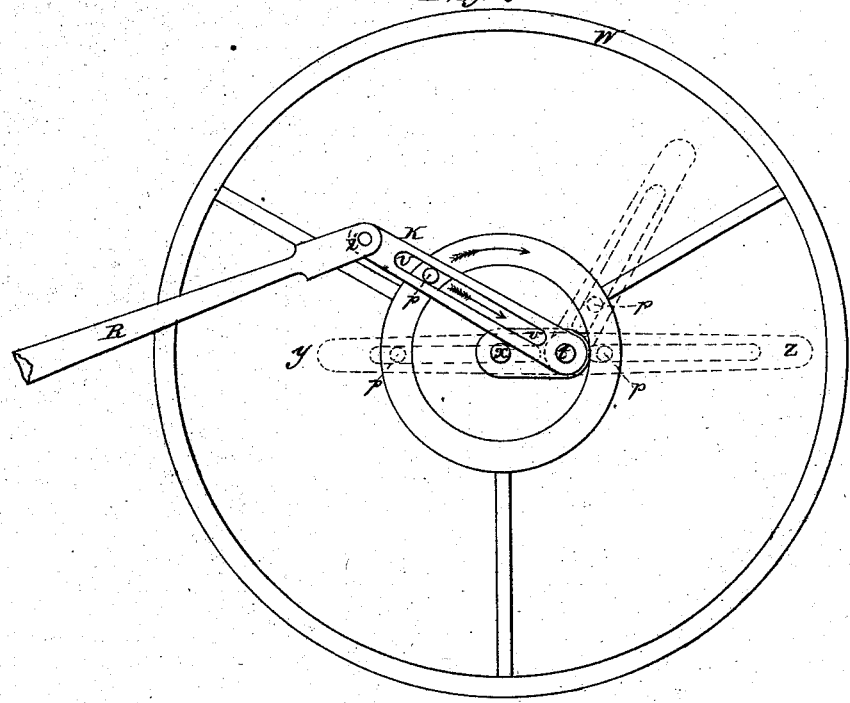
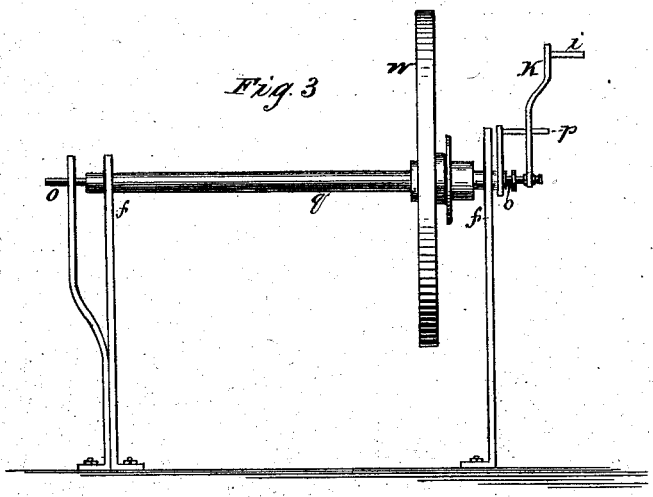
Witnesses:
Cass F. Blacklidge
C. M. Knapp
Inventor.
Aylett R. Crihfield

UNITED STATES PATENT OFFICE.

AYLETT R. CRIHFIELD, OF LINCOLN, ILLINOIS.

IMPROVEMENT IN CRANKS AND LEVERS.

Specification forming part of Letters Patent No. 163,001, dated May 11, 1875; application filed February 4, 1875.

*To all whom it may concern:*

Be it known that I, AYLETT R. CRIHFIELD, of the city of Lincoln, county of Logan and State of Illinois, have invented certain Improvements in Engines for Motive Power; and hereby declare the following to be a full, clear, and concise specification of the same.

In order that persons may readily understand and build the same, I have appended hereto drawings, in which like letters indicate like parts in the different drawings.

The object of this invention is to utilize the expansive force of steam, gas, or air when under pressure.

I construct an engine with a cylinder, piston-head, and rod, as shown in Fig. 1 by H and P; also a cross-head, C, sliding bars $s\ s$, connection-rod R, and fly-wheel W. I construct a crank, which is made to operate or exert power upon the shaft $q$, which carries the fly-wheel. Said crank I cause to lengthen with the motion of the machinery, taking on the form of a compound lever. I attach a crank, K, to a permanent shaft, O, Fig. 3, by a crank-pin, $t$, said pin, upon which said crank K is made to turn, being to one side of the center of the permanent shaft O, the center being indicated by X. By permanent shaft O I mean that said shaft is made stationary or solid, and does not move or rotate, and that the pin $t$ is attached to the same, and is also stationary. The crank K is made to revolve upon the pin $t$, and is the center of motion of the crank K. Said crank K is connected with the piston-rod by the connection-rod R at $i$. On the outside of the permanent shaft O I place a hollow shaft, $q$, Fig. 3. This hollow shaft is made to rest upon, and is supported by, the permanent shaft O, and revolves thereon, and is supported as shown at $ff$, Fig. 3. Said hollow shaft $q$ carries the fly-wheel W. The permanent shaft O passes through the hollow shaft $q$, and is made fast and solid, as shown in Fig. 3, by being secured to a solid bearing or support. The center of motion of the fly-wheel W and of the hollow shaft $q$, which carries the same, is at X, and the center of motion of the crank K is at the pin $t$. To transfer the power which is exerted upon the crank K to the hollow shaft $q$ and fly-wheel W, I fasten to the hollow revolving shaft $q$ a permanent pin, which I cover by a friction-roller. Said pin is shown at $p$. Into the crank K I cut a slot, shown at $v\ v$. Into said slot the pin $p$ is made to work or move as the engine moves. When power is applied to the crank K, pressure is made upon the pin $p$, and as the hollow shaft $q$ and fly-wheel revolve around and upon the permanent shaft O, the pin $p$ moves down the slot $v\ v$ in the direction of the arrow, which is inside of the slot $v\ v$. The arrow outside of the slot $v\ v$ shows the direction of the fly-wheel. The dotted lines in Fig. 2 show the positions of the crank K at various points of the circle made by the said crank K as it passes around its center of motion at $t$. The distance between the pin $p$ and the pin $t$ diminishes as the crank K moves around, and causes the crank K to lengthen. If the steam-supply is cut off at one-third of the stroke of the piston the expansion of the remaining steam is exerted upon the crank K as it extends in length, thereby securing what I think has hitherto been lost.

What I claim as my invention is—

The combination of the stationary shaft O, the revolving shaft $q$, the slotted crank K, the pins $p$ and $t$, operating together for the purposes herein described.

AYLETT R. CRIHFIELD.

Witnesses:
 CASS F. BLACKLIDGE,
 C. W. KNAPP.